（12） United States Patent
Schulze et al.

(10) Patent No.: US 12,366,294 B2
(45) Date of Patent: Jul. 22, 2025

(54) PISTON FOR A VALVE, ELECTROMAGNETIC VALVE AND FUEL CELL SYSTEM

(71) Applicant: ECO Holding 1 GmbH, Marktheidenfeld (DE)

(72) Inventors: Dietmar Schulze, Muenzenberg (DE); Christian Jung, Roden (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 18/199,300

(22) Filed: May 18, 2023

(65) Prior Publication Data

US 2024/0384798 A1 Nov. 21, 2024

(30) Foreign Application Priority Data

Jun. 2, 2022 (DE) .......................... 102022114019.9

(51) Int. Cl.
*F16K 1/36* (2006.01)
*F16K 1/46* (2006.01)
*F16K 31/06* (2006.01)

(52) U.S. Cl.
CPC ................. *F16K 1/36* (2013.01); *F16K 1/46* (2013.01); *F16K 31/06* (2013.01)

(58) Field of Classification Search
CPC ... F16K 1/36; F16K 1/46; F16K 31/06; F16K 3/02
See application file for complete search history.

(56) References Cited

U.S. PATENT DOCUMENTS

| | | | | | |
|---|---|---|---|---|---|
| 2,448,429 | A | * | 8/1948 | Henry | F16K 1/46 137/68.28 |
| 2,457,492 | A | * | 12/1948 | Raybould | F16K 1/46 251/332 |
| 3,511,475 | A | * | 5/1970 | Pfau | F16K 1/36 251/333 |
| 4,671,490 | A | * | 6/1987 | Kolenc | F16K 41/12 251/267 |
| 8,297,593 | B2 | * | 10/2012 | Muzzo | F16K 1/02 251/367 |
| 10,378,657 | B2 | * | 8/2019 | Lin | F16K 1/46 |
| 11,703,142 | B2 | * | 7/2023 | Nakanishi | F16K 27/029 251/129.15 |

(Continued)

FOREIGN PATENT DOCUMENTS

DE 102012211575 A1 * 1/2014 ............... F16K 1/46
FR 2209433 A5 * 10/1973

*Primary Examiner* — Jessica Cahill
(74) *Attorney, Agent, or Firm* — Von Rohrscheidt Patents

(57) ABSTRACT

A piston for a valve configured to control a gaseous medium, the piston including a piston head configured as a closure element and including a seal configured to seal the piston at a valve seat, wherein the seal is arranged at the piston head by a retainer. An electromagnetic valve configured to control a gaseous medium, the electromagnetic valve including an armature; and the piston operatively connected with the armature, wherein the piston head is applicable to the valve seat for closing one or plural pass-through openings of the electromagnetic valve. A fuel cell system including at least one fuel cell stack; a cathode supply; an anode supply; and the electromagnetic pressure regulation valve arranged in the anode supply.

7 Claims, 3 Drawing Sheets

(56) References Cited

U.S. PATENT DOCUMENTS

| | | | |
|---|---|---|---|
| 2005/0253103 A1* | 11/2005 | Bente | F16K 31/0655 251/129.15 |
| 2010/0001222 A1* | 1/2010 | Muzzo | F16K 1/46 251/328 |
| 2012/0082916 A1* | 4/2012 | Maier | F16K 31/0658 429/454 |
| 2019/0085999 A1* | 3/2019 | Chen | F16K 31/0655 |
| 2019/0368616 A1* | 12/2019 | Hagen | F16K 3/314 |

* cited by examiner

PISTON FOR A VALVE, ELECTROMAGNETIC VALVE AND FUEL CELL SYSTEM

RELATED APPLICATIONS

This application claims priority from and incorporates by reference German application DE 10 2022 114 019.9 filed on Jun. 2, 2022.

FIELD OF THE INVENTION

The invention relates to a piston for a valve for controlling a gaseous medium, an electromagnetic valve for controlling a gaseous medium and a fuel cell system, including the valve.

BACKGROUND OF THE INVENTION

A general configuration for a fuel cell system for a motor vehicle is well known. Fuel cell systems with an anode supply and a cathode supply are also well known. Fuel cell systems use a chemical reaction of a fuel with oxygen into water for generating electrical energy. In order to supply a fuel cell stack of the fuel system with operating agents an anode supply for feeding and extracting the anode operating agent, e.g. hydrogen a cathode supply for feeding and exhausting the cathode operating agents, e.g. air and a coolant loop are provided. The anode and cathode supply respectively include a supply conduit for feeding the operating agent and an exhaust gas conduit. The anode supply furthermore includes a recirculation conduit configured to feed hydrogen included in the anode side exhaust gas of the fuel cell stack back into the fuel cell stack.

The fuel cell system uses various valves for various functions including a pressure regulation valve in the anode supply between a high-pressure range and a medium pressure range.

The automobile industry constantly thrives for economic and functional optimization. Thus, it is an object of the invention to provide an improved piston for a valve for controlling a gaseous medium. Another object of the invention is to provide an optimized electromagnetic valve for controlling a gaseous medium and a fuel cell system configured therewith.

BRIEF SUMMARY OF THE INVENTION

Thus, the object is achieved by the features of claim 1. The piston according to the invention for a valve for controlling a gaseous medium, in particular hydrogen includes a piston head configured as a closure element, wherein the piston head includes a seal at a face of the piston head, the seal configured to seal the piston at a valve seat. According to the invention, the seal is arranged at the piston head by a retainer. In known pistons the seals are typically injection molded onto the closure element. This process is complex and time consuming. The invention facilitates replacing this complex process by a simple assembly process.

According to an advantageous embodiment of the invention the seal is arranged in a recess of the piston head and includes a circumferential support portion at a face oriented away from the piston head. The seal can then be mounted by a simple assembly process in the recess of the piston head and attached in the support portion.

Advantageously the support element is configured as a sleeve with a radially inward oriented circumferential protrusion, wherein the sleeve is connected with the piston head by friction locking and the retaining portion of the seal is supported by the protrusion at the piston head. Put differently, the sleeve can be pressed onto the piston head in a simple manner. The seal or the piston head do not require any complex shapes.

According to an advantageous embodiment of the invention the seal can include a central seal portion at a face oriented away from the piston head inside the circumferential retaining portion wherein the sealing portion extends axially beyond the retaining portion. This facilitates a contact at the advantageously annular valve seat and thus sealing when the closure element is closed in a simple manner.

Advantageously the seal includes a center sealing portion at its face oriented away from the piston head and arranged inside the circumferential retaining portion, wherein the sealing portion axially extends beyond the circumferential protrusion of the retainer so that the sealing is assured.

The object is also achieved by an electromagnetic valve for controlling a gaseous medium, in particular hydrogen, the electromagnetic valve comprising a magnetic armature and a piston operatively connected with the magnetic armature wherein the piston head is applicable to a valve seat to close one or plural pass-through openings of the valve.

According to another advantageous embodiment the valve is configured as a pressure regulation valve.

The object is also achieved by a fuel cell system including at least one fuel cell stack, a cathode supply and an anode supply and a pressure regulation valve arranged in the anode supply.

The subsequent detailed description of the invention and the patent claims define further advantageous embodiments and features of the invention.

BRIEF DESCRIPTION OF THE DRAWINGS

The invention is now described based on advantageous embodiments with reference to drawing figures, wherein.

DETAILED DESCRIPTION OF THE INVENTION

Figure 1:
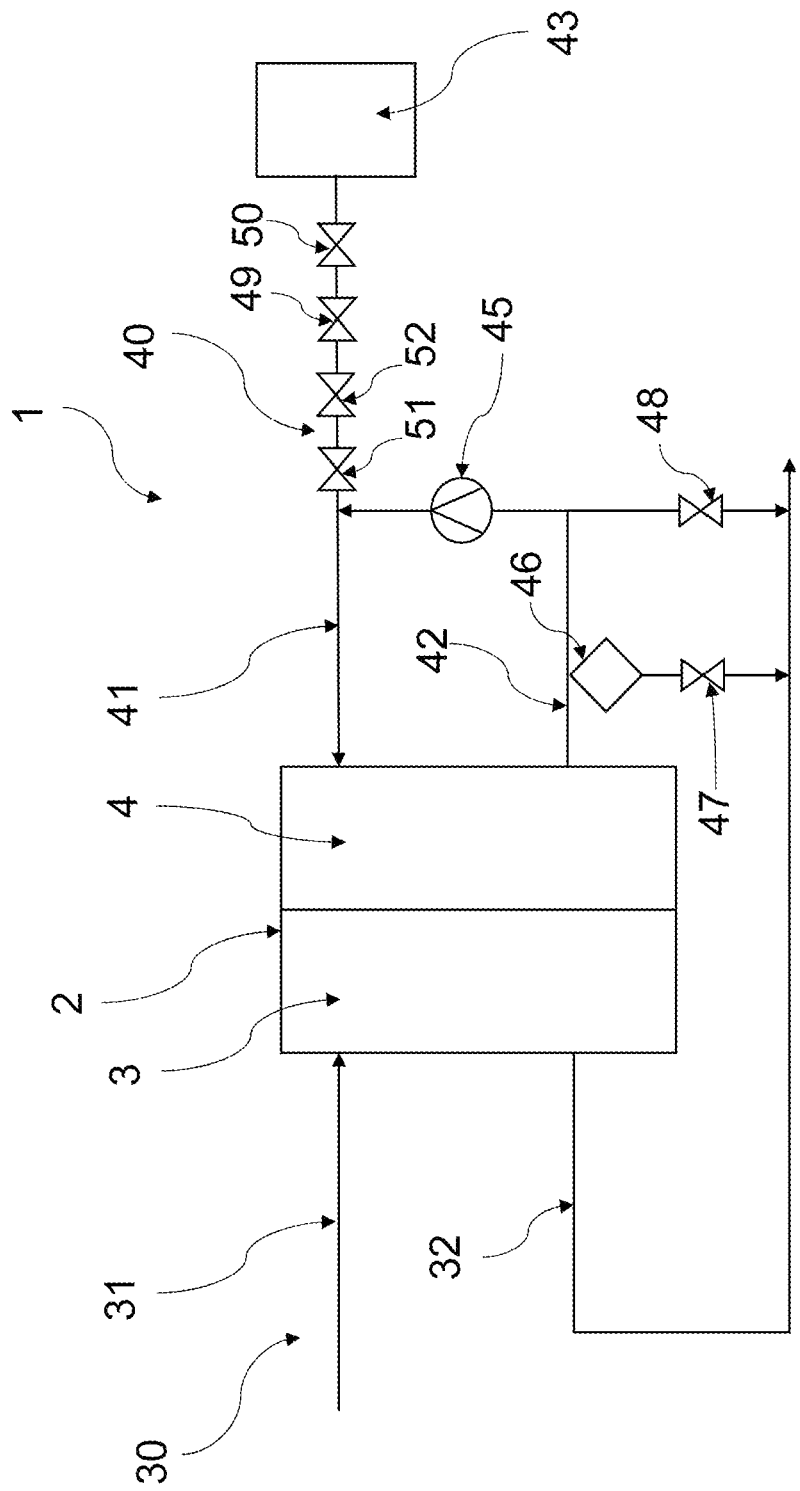
FIG. 1 illustrates a known fuel cell system.

FIG. 1 shows a view of a known fuel cell system of a vehicle, in particular of an electric vehicle including an electric traction motor which is supplied with electric energy by the fuel cell system 1.

The fuel cell system 1 includes a fuel cell stack 2 which is typically configured as a stack of PEM-fuel cells. A cathode supply 30 for feeding and exhausting a cathode operating agent, e.g. air is associated with a common cathode cavity 3 and an anode supply 40 for feeding and exhausting an anode operating agent, e.g. hydrogen is associated with a common anode cavity 4.

The cathode supply 30 includes a cathode supply conduit 31 which feeds air pulled from ambient to the common cathode cavity 3 of the fuel cell stack 2. A cathode exhaust conduit 32 exhausts cathode exhaust gas from the cathode cavity 3. Optionally the cathode exhaust gas is fed to a non-illustrated exhaust system.

The anode supply 40 includes an anode supply conduit 41 which provides the anode operating agent, in particular hydrogen from a hydrogen tank 43 to the anode cavity 4. The anode supply conduit 41 typically includes a pressure control valve 49, a tank valve 50, a dosing valve 51 and a cut off valve 52. An anode exhaust gas conduit 42 exhausts anode exhaust gas from the anode cavity 4. The anode supply 40 furthermore includes a recirculation conduit 44 configured to feed hydrogen included in the anode exhaust gas of the fuel cell stack 2 back into the fuel cell stack 2 through a recirculation device 45, e.g. a recirculation blower.

Furthermore, the anode exhaust gas conduit 41 includes a water precipitator 46 including a downstream drain valve 47 configured to drain product water generated by the fuel cell reaction and a purge valve 48 configured to drain the anode gasses, mostly nitrogen.

Figure 2:
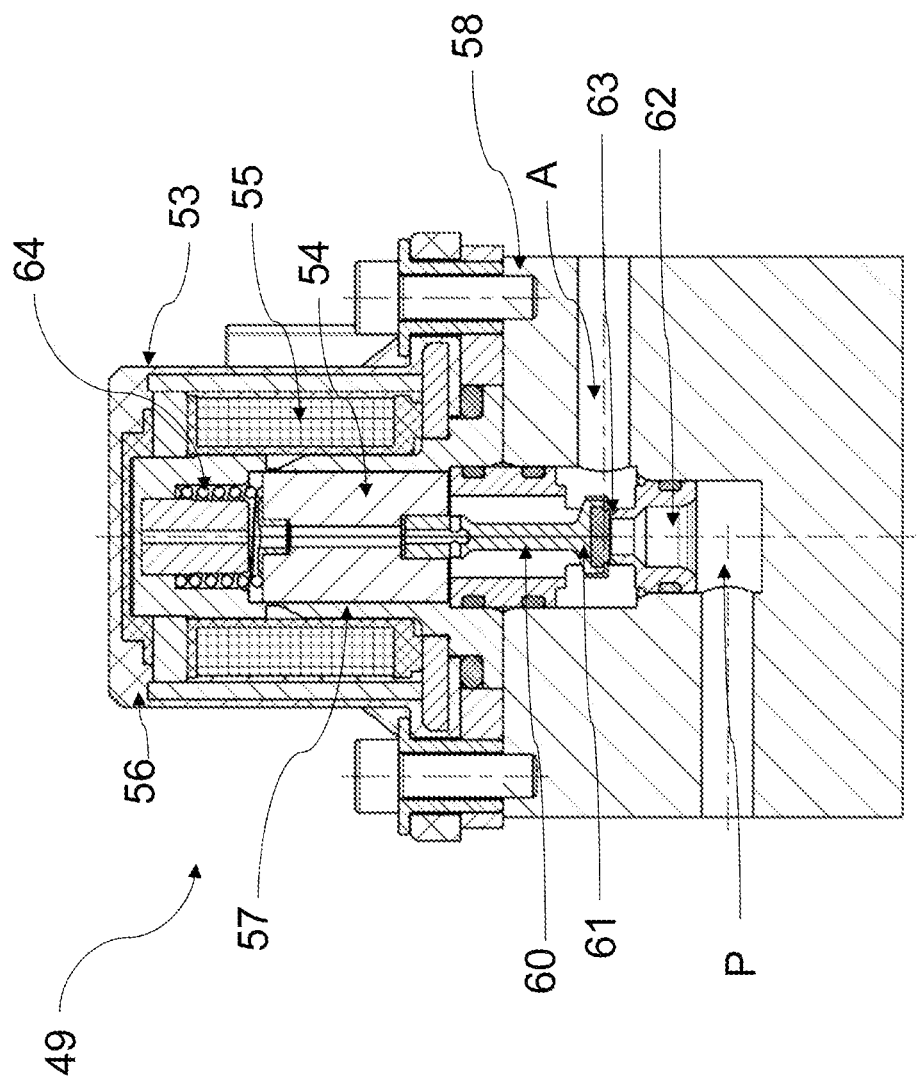
FIG. 2 illustrates a pressure regulation valve according to the invention.

FIG. 2 shows an exemplary pressure regulation valve 49 configured as an electromagnetic proportional valve and arranged between a high-pressure portion and a medium pressure portion of the anode supply 40.

The pressure control valve 49 includes an electromagnetic drive 53 including a magnetic armature 54 that is received axially movable in a pole cap 57 by a magnet coil 55 including the armature 54. A synthetic material housing 56 envelopes the magnet coil 55 at an outer circumference and at least at one face wherein the housing 56 is attached and sealed at a valve housing 58. The pole cap 57 can be integrally configured in one piece and includes a pole core and a pole tube in axial sequence, which however can also be configured as discrete and separate elements.

A piston 60 operatively connected with the armature 54 includes a piston head 61 configured as a closure element and applicable to a valve seat 63 for closing one or plural pass-through openings 62. The illustrated embodiment includes a pass-through opening 62 integrally configured in one piece with the valve seat 63. This pass-through opening 62 connects a pressure connection P with an outlet A of the valve body 58.

As evident from FIG. 2 the pressure control valve 49 is closed in a condition where no electricity flows and the piston head 61 of the piston 60 is pressed against the valve seat 63 since the armature 54 is pressed towards a closed position by the compression spring 64. When the magnet coil 55 is provided with current, the armature 54 moves upward in the illustrated embodiment, this means in the opening direction so that the pass-through opening 62 is opened as a function of the electrical current and the pressure connection P is connected with the outlet A.

Figure 3:
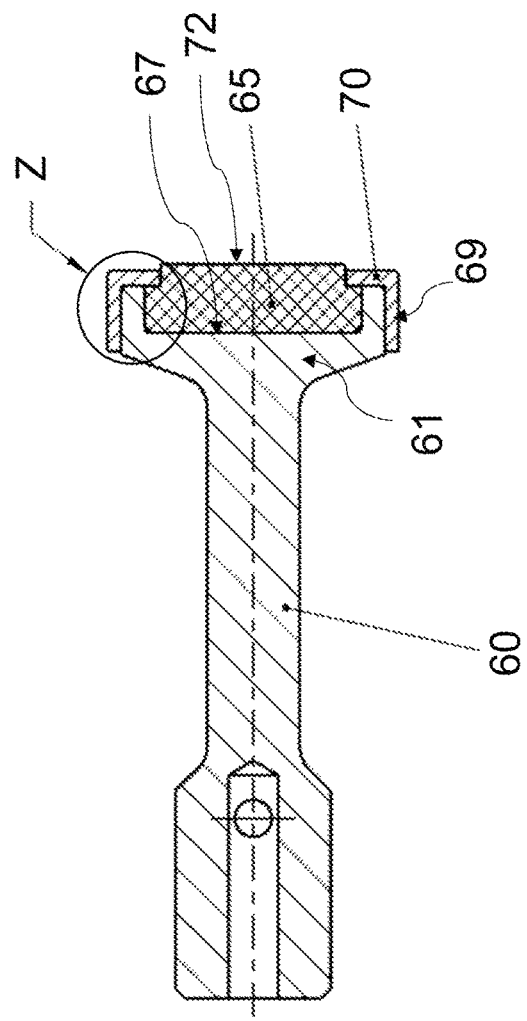
FIG. 3 illustrates a cross section of a piston according to the invention.

FIG. 3 illustrates a cross section of the piston 60. The disc shaped piston head 61 includes a seal 65 at a face of the piston head configured to seal the piston 60 at the valve seat 63. Thus, the seal 65 is arranged at the piston head 61 by a retainer 69. In known pistons the seals are typically injection molded onto the closure element. This process is complex and time consuming. The invention replaces this complex process with a simple assembly process.

It is evident that the seal 65 is arranged in a recess 67 of the piston head 1 and includes a circumferential retaining portion 68 at a face oriented away from the piston head so that the seal 65 can be mounted in the recess 67 of the piston head 61 by a simple assembly process and attached in the retaining portion 68.

Figure 4:
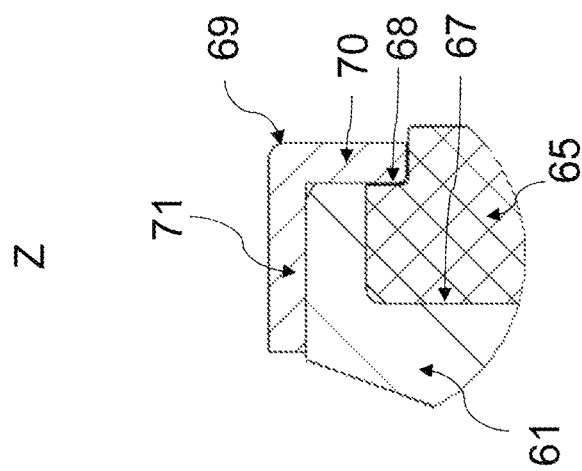
FIG. 4 illustrates a blown up detail Z of the piston according to FIG. 3.

The retainer 69 that is configured as a sleeve with a radially inward oriented circumferential protrusion 70 is connected form locking with the piston head 61 so that the retaining portion 68 of the seal 65 can be retained at the piston head 61 by the protrusion 70. As evident in particular from FIG. 4 showing a blown-up detail Z of the piston 60 the sleeve is pressed onto the piston head 61 with a cylindrical wall 71.

The seal 65 includes a center sealing portion 72 at a face oriented away from the piston head 61 within the circumferential retaining portion 68 wherein the central sealing portion 72 extends axially beyond the retaining portion 68 and the circumferential protrusion 70 of the retainer 69. This achieves the contact at the advantageously annular valve seat in a simple manner and thus reliable sealing when the closure element is closed.

Since a thickness of the seal 65 in the retaining portion 68 is narrower than or identical to a recess depth of the recess 67, thus forming an air gap between the protrusion 70 and the retaining portion 68, the sleeve 69 can be pressed into contact with the piston head 61, so that the seal 65 can be arranged in the piston head 61 without deformation.

All features described and shown in the individual embodiments of the invention can be used in various combinations when practicing the invention in order to achieve their advantageous effects. The spirit and scope of the invention is defined exclusively by the patent claims and is not limited by the features provided in the description or shown in the drawing figures.

What is claimed is:

1. An electromagnetic valve configured to control a gaseous medium, the electromagnetic valve comprising:
   an armature; and
   a piston operatively connected with the armature, the piston including:
   a piston head configured as a closure element and including a seal configured to seal the piston at a valve seat,
   wherein the seal is arranged at the piston head by a retainer,
   wherein the seal is arranged in a recess of the piston head and includes a circumferential retaining portion at a face of the seal oriented away from the piston head,
   wherein the seal includes a center portion at an axial face oriented away from the piston head and arranged within the circumferential retaining portion,
   wherein the axial face is configured as a closed substantially circular disk,
   wherein the center sealing portion extends axially beyond the circumferential retaining portion, and the piston head, and
   wherein the piston head is applicable to the valve seat for closing one or plural pass-through openings of the electromagnetic valve.

2. The electromagnetic valve configured to control the gaseous medium according to claim 1,
   wherein the retainer is configured as a sleeve including a radially inward oriented circumferential protrusion, and
   wherein the sleeve is connected by friction locking with the piston head and the circumferential retaining portion of the seal is retained by the protrusion at the piston head.

3. The electromagnetic valve configured to control the gaseous medium according to claim 2,
   wherein the center sealing portion axially extends beyond the retaining portion and the circumferential protrusion of the retainer.

4. The electromagnetic valve according to claim 1, wherein the electromagnetic valve is provided as a pressure regulation valve.

5. A fuel cell system, comprising:
at least one fuel cell stack;
a cathode supply;
an anode supply, and
the electromagnetic pressure regulation valve according to claim 4 arranged in the anode supply.

6. The electromagnetic valve according to claim 1,
wherein the gaseous medium is hydrogen, and
wherein a flow of the hydrogen is cut off when the center sealing portion is in contact with the valve seat and the flow of the hydrogen is enabled when the center sealing portion does not contact the valve seat.

7. The electromagnetic valve according to claim 1,
wherein the center sealing portion protrudes from the piston head as a straight circular cylinder, and
wherein an outer perimeter of the axial face of the center sealing portion configured as the closed substantially circular disk seals at the valve seat and an inner portion of the closed substantially circular disk does not seal at the valve seat.

* * * * *